US006900552B2

(12) United States Patent
Fukano et al.

(10) Patent No.: US 6,900,552 B2
(45) Date of Patent: May 31, 2005

(54) SYSTEM FOR CONTROLLING STARTING AND STOPPING OF ENGINE

(75) Inventors: Yuji Fukano, Aichi (JP); Hisashi Kato, Aichi (JP); Kenji Hidaka, Aichi (JP); Osamu Inagaki, Aichi (JP); Tomoyuki Funayama, Toyota (JP); Toshio Asahi, Toyota (JP); Toshinori Aoki, Toyota (JP); Koji Iwamoto, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 161 days.

(21) Appl. No.: 10/615,104

(22) Filed: Jul. 8, 2003

(65) Prior Publication Data

US 2004/0027079 A1 Feb. 12, 2004

(30) Foreign Application Priority Data

Jul. 9, 2002 (JP) ....................................... 2002-200157
Jun. 3, 2003 (JP) ....................................... 2003-158556

(51) Int. Cl.[7] ................................................ H02P 9/04

(52) U.S. Cl. .................. 290/40 C; 290/40 R; 318/141; 322/28

(58) Field of Search ................................ 290/40 R, 41, 290/40 C; 322/28, 24; 318/140, 141

(56) References Cited

U.S. PATENT DOCUMENTS 4,275,344 A * 6/1981 Mori et al. .................. 322/28
5,793,167 A * 8/1998 Liang et al. ................ 318/141
5,900,722 A * 5/1999 Scott et al. .................. 322/46
6,573,689 B1 * 6/2003 Renehan ...................... 322/24
6,597,071 B2 * 7/2003 Hiyama et al. ........... 290/38 R

FOREIGN PATENT DOCUMENTS

EP 0 742 128 A1 11/1996
EP 1 053 919 A1 11/2000
GB 2 079 837 A 1/1982

* cited by examiner

*Primary Examiner*—Nicholas Ponomarenko
(74) *Attorney, Agent, or Firm*—Crompton, Seager & Tufte, LLC

(57) ABSTRACT

An engine start/stop control system for preventing an engine from stopping when a vehicle is traveling. The system includes an IG1 driver circuit arranged between a power supply control unit and an IG1 relay. The IG1 driver circuit is activated in accordance with an activation signal from the power supply control unit or an output signal of a latch circuit and includes an FET for activating a relay. The latch circuit keeps the FET ON and the relay activated unless the vehicle stops traveling and a start/stop switch is pushed.

20 Claims, 5 Drawing Sheets

| INa | INb | OUT |
|---|---|---|
| - | L | L |
| L | H | H |
| H | H | L |

| INa | INb | OUT |
|---|---|---|
| − | L | L |
| L | H | H |
| H | H | L |

| INa | INb | OUT |
|---|---|---|
| - | L | L |
| L | H | H |
| H | H | L |

| INa | INb | OUT |
|---|---|---|
| - | L | L |
| L | H | H |
| H | H | L |

SYSTEM FOR CONTROLLING STARTING AND STOPPING OF ENGINE

BACKGROUND OF THE INVENTION

The present invention relates to a system for controlling starting and stopping of an engine, and more particularly, to a system for starting and stopping an engine in response to a single push operation by a driver.

Generally, a vehicle is switched into a functional position by operating a key switch, which is arranged in the passenger compartment. The key switch is a rotary switch, which is rotated by an authorized key. The rotation of the key switch moves the switch between a movable contact and a fixed contact to select one of the functional positions, which are "OFF", "accessory (ACC)", "ignition on (ON)", and "start (ST)".

A manual push button switch is arranged in the passenger compartment of recent vehicles for a driver to start and stop the engine. An engine control system alternately starts and stops the engine whenever the manual button switch is operated. In a vehicle having both a manual button switch and a key switch, the driver must perform a rotating operation for switching to a functional position and a pushing operation for starting and stopping the engine. This results in the switches being inconvenient.

FIG. 6 shows a prior control system 61 for starting and stopping the engine. A power supply control unit 62 is connected to a start/stop switch 63, an engine control unit 72, and driver circuits 68, 69, 70, 71, which respectively activate an ACC relay 64, an IG1 relay 65, an IG2 relay 66 and an ST relay 67. In response to an operation signal from the switch 63, the power supply control unit 62 sends a control signal to each of the driver circuits 68–71 respectively to control activation of the associated relays 64–67. The power supply control unit 62 sends control signals to the driver circuits 68–71 and the engine control unit 72 to control the starting of the engine.

The power supply control unit 62 controls the starting and stopping of the engine when the operation signal is continuously received from the start/stop switch 63 for more than a predetermined time. When the operation signal is received from the start/stop switch 63 for a short time, the power supply control unit 62 switches functional positions. Therefore, if a manual button switch is used as the start/stop switch 63, the switching of functional positions and the starting and stopping of the engine are enabled by convenient single push operations.

The power supply control unit 62 is electronically controlled to activate and inactivate the relays 63–67. Therefore, when noise results in abnormal functioning of the power supply control unit 62, the relays 64–67 may also function erroneously. If the power supply control unit 162 functions abnormally when the vehicle is traveling and inactivates the first ignition relay (IG1) 65 and the second ignition relay (IG2) 66, the engine may stop.

SUMMARY OF THE INVENTION

An object of the present invention is to provide an engine control system that prevents an engine from stopping when a vehicle is traveling.

To achieve the above object, the present invention provides a system for controlling starting and stopping of an engine in a vehicle. The vehicle has a plurality of electric devices including a driving electric device required to keep the vehicle in a traveling state. The system includes a plurality of switching circuits for supplying power and stopping the supply of power to the electric devices. The plurality of switching circuits include a driving switching circuit for supplying power or stopping the supply of power to the driving electric device. A power supply control unit generates a plurality of activation signals, each switching an associated one of the switching circuits between an inactivated state and an activated state. An activation holding circuit holds the state of the driving switching circuit and enables the driving switching circuit to be switched from an activated state to an inactivated state when the vehicle is in a non-traveling state.

A further aspect of the present invention is a system for controlling starting and stopping of an engine mounted on a vehicle. The engine includes an electric engine device for operating the engine when activated. The system includes a relay connected to the electric engine device to supply the electric engine device with power when activated. A driver circuit activates and inactivates the relay in response to an activation signal. A power supply control unit provides the driver circuit with the activation signal. A latch circuit is connected to the driver circuit for holding the relay in the activated state when the vehicle is traveling and for enabling the relay to be switched from the activated state to an inactivated state for at least when the vehicle is not traveling.

A further aspect of the present invention is a system for controlling starting and stopping of an engine in a vehicle. The vehicle has a plurality of electric devices including a driving electric device required to keep the vehicle in a traveling state. The system includes a plurality of switching circuits for supplying power and stopping the supply of power to the electric devices. The plurality of switching circuits includes a driving switching circuit for supplying power or stopping the supply of power to the driving electric device. A power supply control unit generates a plurality of activation signals, each switching an associated one of the switching circuits between an inactivated state and an activated state. A holding means holds the state of the driving switching circuit and enables the driving switching circuit to be switched from an activated state to an inactivated state when the vehicle is in a non-traveling state.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Hereinafter, a single push type control system for starting and stopping an engine (engine control system) according to a first embodiment of the present invention will now be discussed. In the first embodiment, an engine is mounted on a vehicle 2 employing an electronic steering lock mechanism.

Figure 1:
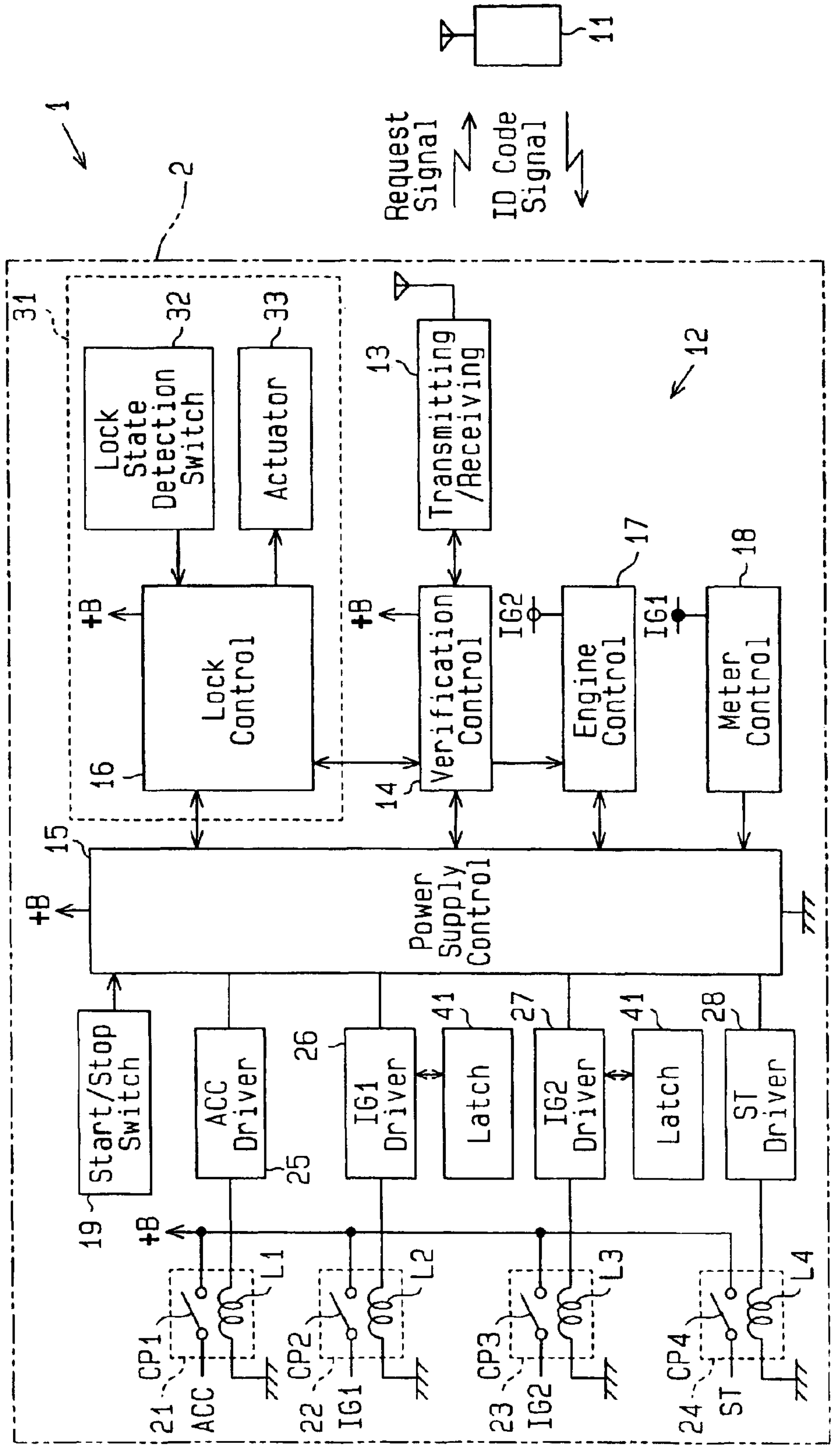
FIG. 1 is a block diagram of a control system for starting and stopping an engine according to a first embodiment of the present invention.

As shown in FIG. 1, the engine control system 1 includes a portable device 11 and a vehicle controller 12 that is arranged in a vehicle 2.

The portable device 11 is carried by a driver and intercommunicates with the vehicle controller 12. The portable device 11 automatically sends an ID code signal that includes a predetermined ID code in response to a request signal provided from the vehicle controller 12. The ID code signal is sent by a radio transmission at a predetermined frequency (for example, 300 MHz).

The vehicle controller 12 has a transmitting-receiving unit 13, a verification control unit 14, a power supply control unit 15, a lock control unit 16, an engine control unit 17, and a meter control unit 18. Each of the control units 14–18 is a CPU unit including a CPU, a ROM, and a RAM (not shown). The transmitting-receiving unit 13 is electrically connected to the verification control unit 14. The verification control unit 14 is electrically connected to the power supply control unit 15, the lock control unit 16, and the engine control unit 17. The power supply control unit 15 is electrically connected to the lock control unit 16, the engine control unit 17, the meter control unit 18 and a start/stop switch 19. The verification control unit 14, the lock control unit 16, the engine control unit 17, and the meter control unit 18 are electrically connected to each other via a communication line (not shown). The start/stop switch 19 is preferably a momentary type manual push button switch.

The transmitting-receiving unit 13 modulates a request signal that is sent from the verification control unit 14 to generate a modulated radio wave of a predetermined frequency (for example, 134 kHz). The transmitting-receiving unit 13 outputs the modulated radio wave in the passenger compartment. Further, the transmitting-receiving unit 13 demodulates an ID code signal that is sent from the portable device 11 to generate a pulse signal and sends the pulse signal to the verification control unit 14.

The verification control unit 14 intermittently sends the request signal to the transmitting-receiving unit 13. The verification control unit 14 compares the ID code that is included in the ID code signal from the transmitting-receiving unit 13 with the ID code that is set in the transmitting-receiving unit 13 to perform ID code verification. When the two ID codes match each other, the verification control unit 14 sends a lock release request signal to the lock control unit 16. When the verification control unit 14 receives a lock release completion signal from the lock control unit 16, the verification control unit 14 sends a starting permission signal to the power supply control unit 15 and the engine control unit 17.

When the two ID codes do not match each other, the verification control unit 14 sends a starting prohibition signal to the power supply control unit 15 and the engine control unit 17. When the verification control unit 14 receives an engine drive signal from the power supply control unit 15 indicating that the engine is running, the verification control unit 14 stops sending the request signal to the transmitting-receiving unit 13.

In the first embodiment, the lock release request signal, the lock release completion signal, the starting permission signal, the starting prohibition signal and the engine drive signal configure binary signal patterns having a predetermined bit number. When an abnormality, such as a short circuit or line breakage, occurs in the transmission path between the verification control unit 14 and each of the control units 14–17, the normal binary signal pattern is not configured. Each of the control units 14–17 determines whether the binary signal pattern is normal or abnormal to detect an abnormality in the transmission path and prevent erroneous functioning of the control unit 14–17.

The lock control unit 16 is electrically connected to a lock condition detection switch 32 and an actuator 33. The lock control unit 16, the lock condition detection switch 32 and the actuator 33 are part of a steering lock mechanism 31. The lock control unit 16 sends an unlock drive signal for releasing the steering lock to the actuator 33 in response to the lock release request signal that is sent from the verification control unit 14. In response to the unlock drive signal, the actuator 33 drives a lock pin (not shown) to disengage a lock pin from the steering shaft. The lock condition detection switch 32 is switched on when the lock pin is completely disengaged from the steering shaft. The lock control unit 16 recognizes the engagement of the lock pin with the steering shaft from the state (ON/OFF) of the lock condition detection switch 32. When recognizing that the lock pin is disengaged from the steering shaft, the lock control unit 16 sends the lock release completion signal to the verification control unit 14.

When receiving the starting permission signal from the verification control unit 14 and the starting signal from the power supply control unit 15, the engine control unit 17 performs fuel injection control and ignition control. The engine control unit 17 detects the driving condition of the engine based on an ignition pulse and alternator output. When determining that the engine is running, the engine control unit 17 sends a cranking completion signal to the power supply control unit 15.

The meter control unit 18 controls the operation of combination meters arranged on an instrument panel. The meter control unit 18 sends a vehicle information signal, which indicates information such as the vehicle velocity, to the power supply control unit 15.

The power supply control unit 15 is connected to an ACC driver circuit 25, an IG1 driver circuit 26, an IG2 driver circuit 27, and an ST driver circuit 28. The driver circuits 25–28 are connected to one end of coils L1–L4 arranged in the accessory relay (ACC) 21, the first ignition relay (IG1) 22, the second ignition relay (IG2) 23 and the starter relay (ST) 24, respectively. The other end of the coil L1–L4 is connected to the earth. The relays 21–24 respectively have contacts CP1–CP4, each having one end connected to a positive terminal (+B) of a battery. The other end of the contact CP1 is connected to power supply terminals of electric devices used to drive accessories. The other end of the contact CP2 is connected to power supply terminals of the engine control unit 17 and the meter control unit 18. The other end of the contact CP3 is connected to a power supply terminal of the engine control unit 17. The other end of the contact CP4 is connected to a starter motor (not shown). The engine control unit 17 is connected to electric power supply routes, one of which leads to the battery via the IG1 relay 22 and another of which leads to the battery via the IG2 relay 23. Therefore, the battery supplies the engine control unit 17 with power when at least either one of the IG1 relay 22 and the IG2 relay 23 is ON. When the ACC relay 21 is activated, the ACC driving devices are supplied with power. When the IG1 relay 22 and the IG2 relay 23 are activated, the engine control unit 17 and the meter control unit 18 are supplied with power. When the ST relay 24 is activated, the starter motor is operated. Therefore, the relays 21–24 are a switching circuit for switching ON and OFF the electric devices in the vehicle 2.

Each of the drivers 25–28 includes a switching element, such as an FET, and is switched ON by an activation signal (a signal having a high level in the first embodiment) to supply the coils L1–L4 of the associated relays 21–24 with power. In other words, the driver circuits 25–28 drives the relay 21–24 in accordance with the activation signals from the power supply control unit 15.

When the starting permission signal is sent from the verification control unit 14 to the power supply control unit 15, the power supply control unit 15 is permitted to start the engine. When the power supply control unit 15 is permitted to start the engine and receives a push operation signal (a signal having a high level in the first embodiment) generated by pushing the start/stop switch 19, the power supply control unit 15 performs engine start control. The power supply control unit 15 sends activation signals to the driver circuit 26–28 and a starting signal to the engine control unit 17. When the driver circuits 26–28 switch ON the associated relays 22–24, the engine control unit 17, the meter control unit 18, and the starter motor are supplied with power.

When the cranking completion signal is sent from the engine control unit 17 to the power supply control unit 15, the power supply control unit 15 determines that the engine has been started. Thus, the power supply control unit 15 stops sending the activation signal to the ST driver circuit 28 and starts sending the activation signal to the ACC driver circuit 25. Therefore, when starting of the engine is completed, the starter motor is stopped, and the ACC drive electric devices are supplied with power.

When the power supply control unit 15 does not receive the starting permission signal from the verification control unit 14, the power supply control unit 15 prohibits starting of the engine. In this state, even if the power supply control unit 15 receives the push operation signal, the power supply control unit 15 does not send the activation signals to the driver circuit 26–28 and the starting signal to the engine control unit 17. Thus, the power supply control unit 15 does not perform operations based on the pushing operation of the start/stop switch 19.

The conditions for permitting stopping of the engine are the engine running and the vehicle 2 traveling. When the engine stopping permission conditions are satisfied and the pushing operation signal is sent to the power supply control unit 15, the power supply control unit 15 stops the engine. The power supply control unit 15 stops sending the activation signals to the driver circuits 25–27 and switches OFF the associated relay 21–23 to stop supplying the electric devices with electric power. In this case, the supply of power to the engine control unit 17 is stopped. This stops the engine.

The IG1 driver circuit 26 and the IG2 driver circuit 27 are respectively connected to the IG1 relay 22 and the IG2 relay 23, which are connected to the electric device (engine control unit 17) that is required to keep the vehicle 2 in a continuously traveling state. A latch circuit 41, which serves as an activation maintaining circuit, is connected to each of the IG1 driver circuit 26 and the IG2 driver circuit 27.

Figure 2A:
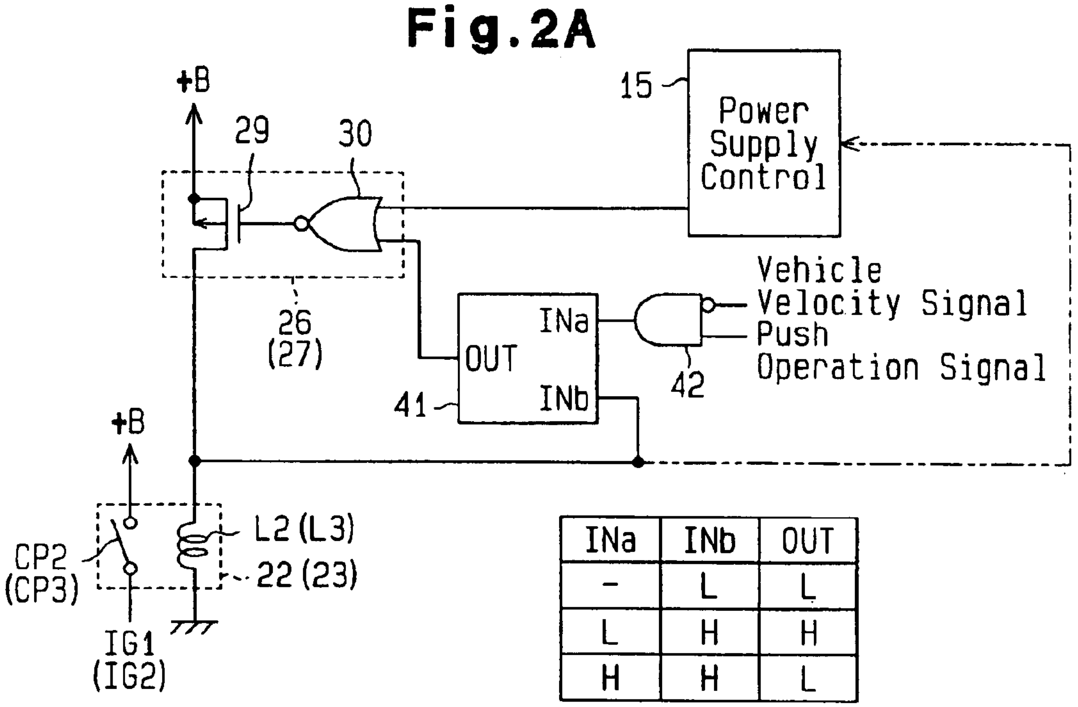
FIG. 2A is a schematic diagram of a relay activation circuit of FIG. 1.

As shown in FIG. 2A, each driver circuit 26, 27 includes a p-channel MOSFET (hereinafter referred to as an FET) 29 and a NOR circuit 30. A first input terminal of the NOR circuit 30 is connected to the power supply control unit 15 and an output terminal of the NOR circuit 30 is connected to a gate terminal of the FET 29. The FET 29 has a source terminal connected to a battery terminal and a drain terminal connected to the coils L2, L3 of the corresponding relays 22 and 23. When the activation signal is output from the power supply control unit 15, the FET 29 is switched ON to activate the relays 22 and 23.

Each latch circuit 41 is configured by an electric device, such as a transistor, and includes two input terminals INa and INb and an output terminal OUT. The first input terminal Ina is connected to the output terminal of an AND circuit 42, and the second input terminal INb is connected to the drain terminal of the FET 29. The output terminal OUT is connected to the second input terminal of the NOR circuit 30. In the AND circuit 42, the first input terminal is provided with a velocity signal and the second input terminal is provided with a pushing operation signal. The AND circuit 42 performs a logical operation with an inverted velocity signal and the pushing operation signal and outputs the result. In the first embodiment, the velocity signal is generated by hardware, such as an integrating circuit, from a speed pulse detected by a speed sensor (not shown). The velocity signal is high when the velocity has a value (the vehicle traveling) and low when the velocity is null (the vehicle not traveling).

When the signal provided to the second input terminal INb is low, the signal output from the output terminal OUT of each latch circuit 41 is low regardless of the level of the input signal to the first input terminal INa. When the signal provided to the first input terminal INa is low and the signal provided to the second input terminal INb is high, the signal output from the output terminal OUT of each latch circuit 41 is high. When the signals provided to the first and second input terminals Ina and INb are high, the signal output from the output terminal OUT of the latch circuit 41 is low. In other words, when the activation signal from the power supply control unit 15 activates the FET 29, the signal output from the output terminal OUT of the latch circuit 41 remains high until the signal provided to the first input terminal INa goes high. Therefore, even if the activation signal is not output from the power supply control unit 15, the output signal from the latch circuit 41 keeps the FET 29 ON and the relays 22 and 23 activated.

When the signal provided to the first input terminal INa is high, that is, when the velocity signal and the pushing operation signal that are provided to the AND circuit 42 are low, the signal output from the output terminal OUT of the latch circuit 41 is low. When the above-described engine stop permission conditions are satisfied and the start/stop switch 19 is pushed, the power supply control unit 15 stops sending the activation signals to the driver circuit 26 and 27. This causes the signal sent from the NOR circuit 30 to the FET 29 to go high and switches OFF the FET 29 and inactivates the corresponding relays 22 and 23 to stop the engine.

Figure 2B:
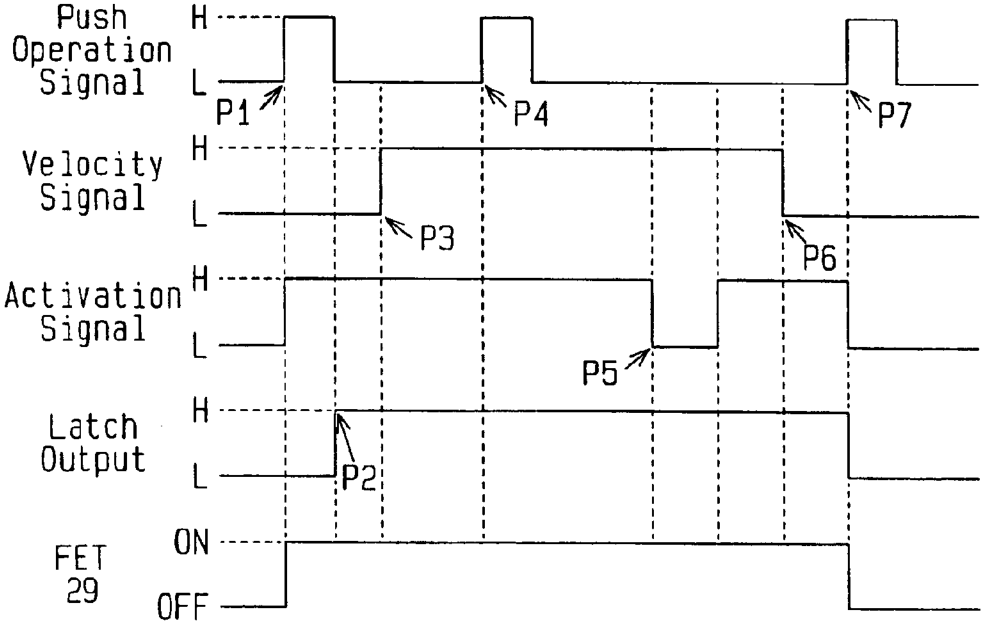
FIG. 2B is a chart illustrating the output timing of various signals in the relay activation circuit of FIG. 2A.

Next, the operation of the engine start/stop control system 1 will be discussed. More specifically, control of the IG1 relay 22 and the IG2 relay 23 when starting and stopping the engine of the vehicle 2 in a parked state will be described with reference to the time chart of FIG. 2B.

At time P1, the power supply control unit 15, which is in a state in which the starting of the engine is permitted, is provided with a pushing operation signal. In response to the pushing operation signal, the power supply control unit 15 sends the activation signals to the driver circuits 26 and 27, the signal output from the NOR circuit 30 goes low, and the FET 29 is activated. This activates the corresponding relays 22 and 23 and causes the signal provided to the second input terminal INb of the latch circuit 41 to go high. In this state, the velocity signal is low and the pushing operation signal is high. Thus, the signal output from the AND circuit 42 goes high. The high signal is provided to the first input terminal INa of the latch circuit 41, and the signal output from the output terminal OUT is low.

The pushing operation of the start/stop switch 19 is terminated at time P2. This stops providing the pushing operation signal to the second input terminal of the AND circuit 42. Thus, the signal provided from the AND circuit 42 to the first input terminal INa of the latch circuit 41 goes low. Accordingly, the signal output from the latch circuit 41 goes high.

At time P3, the vehicle 2 starts traveling and the velocity signal provided to the power supply control unit 15 and the first input terminal of the AND circuit 42 goes high. The stopping of the engine is prohibited when the vehicle 2 is traveling. Therefore, even if the start/stop switch 19 is pushed when the vehicle is traveling at time P4, the power supply control unit 15 continues to send high activation signals to the driver circuits 26 and 27. Since the latch circuit 41 continues to output the high signal, the FET 29 remains ON. The continuously activated relays 22, 23 keeps the engine running even if the start/stop switch 19 is pressed unintentionally when the vehicle is traveling.

At time P5, the activation signal to the power supply control unit 15 is accidentally stopped when the vehicle is traveling. In this case, since the signal provided to the first input terminal INa of the latch circuit 41 is not high, the latch circuit 41 continues to output the high signal and keeps the FET 29 ON. Since the relays 22 and 23 remain activated, the engine continues to run. Therefore, the IG1 relay 22 and the IG2 relay are not switched OFF when the vehicle is traveling even if the power supply control unit 15 functions erroneously.

At time P6, the vehicle 2 stops and the velocity signal provided to the power supply control unit 15 and the first input terminal of the AND circuit 42 goes low. At time P7, the pushing operation signal is sent to the power supply control unit 15 and the AND circuit 42. In response to the pushing operation signal, the power supply control unit 15 stops sending the activation signal to the driver circuit 26, 27. That is, the signal provided to the first input terminal of the NOR circuit goes low, the signal provided to the first input terminal INa of the latch circuit 41 goes high, and the signal output from the output terminal OUT goes low. Since the signal provided to the second input terminal of the NOR circuit 30 is low, the signal output from the NOR circuit 30 is high. This switches OFF the FET 29 and inactivates the relays 22 and 23 to stop the engine.

The first embodiment has the advantages described below.

(1) The IG1 relay 22 and the IG2 relay 23, which supply and stop the power to the electric devices required to keep the vehicle traveling (e.g., the engine control unit 17), are operated in accordance with the activation signals from the power supply control unit 15. When the vehicle 2 is traveling, the latch circuit 41 keeps the relays 22 and 23 activated. Therefore, even if the activation signals of the power supply control unit 15 are interrupted when the vehicle is traveling, the relays 22 and 23 remain activated. In other words, when the vehicle 2 is traveling, the relays 22 and 23 are not inactivated only by a command from the power supply control unit 15. Therefore, even if the power supply control unit 15 functions erroneously, the engine does not stop in an unexpected manner when the vehicle is traveling.

(2) The signal output from the latch circuit 41 goes high only if the start/stop switch 19 is pushed when the vehicle 2 is not traveling. That is, the stopping of the engine is enabled only if the start/stop switch 19 is pushed when the vehicle 2 is not traveling. Therefore, even if the power supply control unit 15 functions erroneously, the engine is stopped only when the driver intends to do so. That is, the engine does not stop unless the start/stop switch 19 is pushed. Thus, accidental stopping of the engine is prevented.

(3) The configuration for obtaining advantages (1) and (2) is relatively simple. Thus, the circuit is not complicated and does not have many components.

Next, a second embodiment of the present invention will be discussed with reference to FIGS. 3A and 3B. Differences from the first embodiment will be described. In the second embodiment, the IG1 driver circuit 26 and the IG2 driver circuit 27 differ from those in the first embodiment.

Figure 3A:
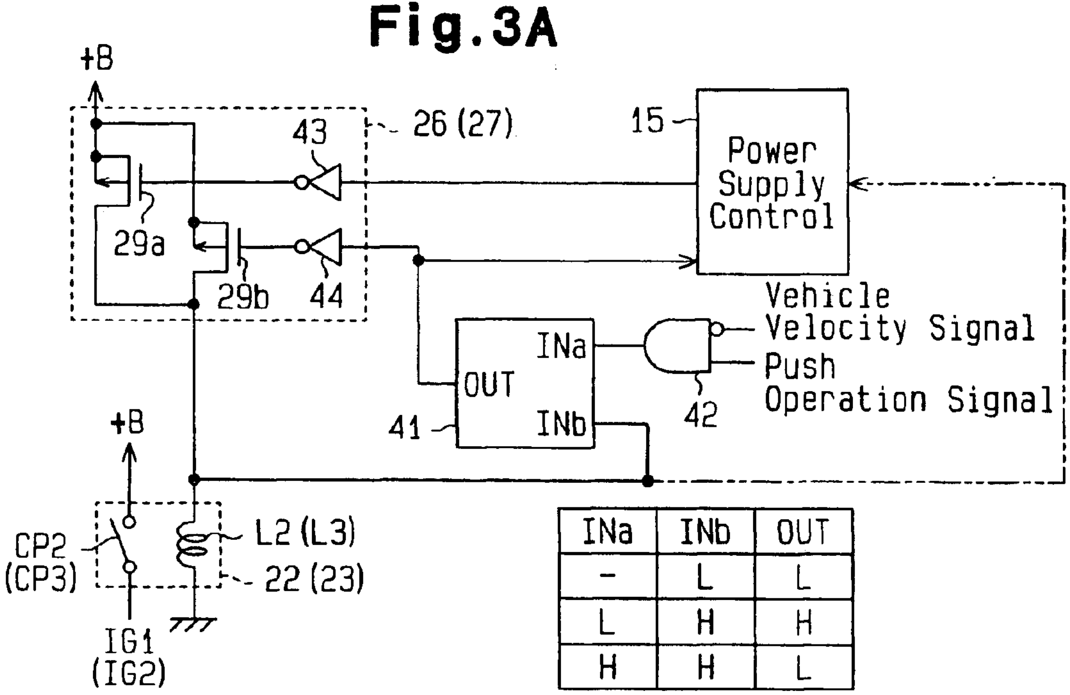
FIG. 3A is a schematic diagram of a relay activation circuit according to a second embodiment of the present invention.
Figure 3B:
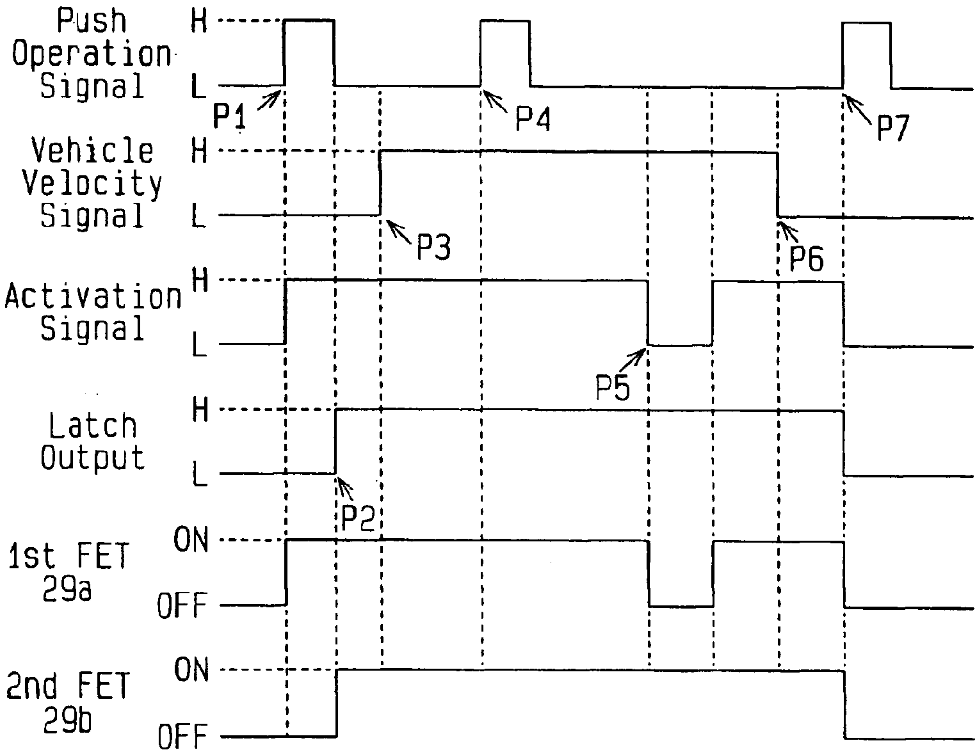
FIG. 3B is a chart illustrating the output timing of various signals in the relay activation circuit of FIG. 3A.

As shown in FIG. 3A, the driver circuits 26 and 27 each include a first p-channel MOSFET 29*a*, which functions as a first activation device, a second p-channel MOSFET 29*b*, which functions as a second activation device, and two inverter circuits 43 and 44.

The FETs 29*a* and 29*b* have source terminals connected to the positive terminal of the battery and drain terminals connected to the coils L2 and L3 of the corresponding relays 22 and 23. That is, the FETs 29*a* and 29*b* are connected in parallel to each other. The gate terminal of the first FET 29*a* is provided with an activation signal from the power supply control unit 15 via the inverter circuit 43. Therefore, the first FET 29*a* goes ON when the activation signal from the power supply control unit 15 goes high. The gate terminal of the second FET 29*b* is provided with the output signal of the latch circuit 41 via the inverter circuit 44. Therefore, the second FET 29*b* goes ON when the output signal of the latch circuit 41 goes high.

Next, the operation of the engine start/stop control system 1 in the second embodiment will be discussed with reference to a time chart of FIG. 3B.

At time P1, the power supply control unit 15, which is in a state in which the starting of the engine is permitted, is provided with a pushing operation signal from the start/stop switch 19. The power supply control unit 15 sends the activation signals to the driver circuits 26 and 27. In response to the activation signal, the first FET 29*a* goes ON. This activates the corresponding relays 22 and 23 causes the signal provided to the second input terminal INb of the latch circuit 41 to go high. However, since the velocity signal is low and the pushing operation signal is high, the signal provided to the first input terminal INa of the latch circuit 41 from the AND circuit 42 is low, and sent the signal output from the output terminal OUT is low. Accordingly, the second FET 29*b* remains OFF.

At time P2, the pushing operation of the start/stop switch 19 is terminated. This stops providing the pushing operation signal to the second input terminal of the AND circuit 42. As a result, the latch circuit 41 starts to output a high signal. This switches ON the second FET 29*b*.

At time P3, the vehicle 2 starts traveling and the velocity signal provided to the power supply control unit 15 and the first input terminal of the AND circuit 42 goes high. When the vehicle 2 is traveling, the stopping of the engine is prohibited. At time P4, the power supply control unit 15 continues to send the activation signals to the driver circuits 26 and 27 even if the start/stop switch 19 is pushed when the vehicle is traveling. Therefore, the first FET 29*a* remains ON. Since the latch circuit continues to output the high signal, the second FET 29*b* also remains ON. Since the relays 22 and 23 remain ON, the engine does not stop even if the start/stop switch 19 is erroneously pushed when the vehicle is traveling.

At time P5, the power supply control unit 15 functions erroneously and stops outputting the activations signals when the vehicle 2 is traveling. This switches OFF the first FET 29*a*. However, the first input terminal Ina of the latch circuit 41 is not provided with a high signal. Therefore, the latch circuit 41 continues to output a high signal. This keeps the second FET 29*b* ON and the relays 22 and 23 activated. Thus, the engine continues running. Accordingly, even if the power supply control unit 15 functions erroneously when the vehicle 2 is traveling, the IG1 relay 22 and the IG2 relay 23 are not switched OFF.

At time P6, the vehicle 2 stops traveling and the velocity signal provided to the power supply control unit 15 and the first input terminal of the AND circuit 42 goes low. At time P7, the pushing operation signal is sent to the power supply control unit 15 and the AND circuit 42, and the power supply control unit 15 stops sending the activation signals to the driver circuits 26 and 27. This switches OFF the first FET 29*a*. Further, the signal provided to the first input terminal INa of the latch circuit 41 is high. Thus, the signal output from the output terminal OUT is low. As a result, the second FET 39*b* is also switched OFF. This inactivates the relays 22 and 23 and stops the engine.

As shown in FIG. 3A, the output signal of the latch circuit 41 is provided to the power supply control unit 15. As described above, if the pushing operation signal is not provided from the start/stop switch 19 when the vehicle 2 is not traveling and the activation signals are provided to the driver circuits 26 and 27 from the power supply control unit 15, the latch circuit 41 outputs a high signal. Therefore, if the power supply control unit 15 receives the high signal from the latch circuit 41 when providing the driver circuits 26 and 27 with the activation signals, the power supply control unit 15 determines that the latch circuit 41 is functioning normally. When the vehicle is not traveling, if the pushing operation signal is not provided to the power supply control unit 15 when the driver circuits 26 and 27 are provided with the activation signals and a low signal from the latch circuit 41, the power supply control unit 15 determines that an abnormality has occurred in the latch circuit 41.

The power supply control unit 15 determines whether an abnormality has occurred in the latch circuit 41 from the output signal if the latch circuit 41. When it is determined that the latch circuit 41 is abnormal, the power supply control unit 15 notifies the driver of the abnormality with an indicator (not shown) arranged in the passenger compartment. The power supply control unit 15 does not make determination of abnormalities when the pushing operation signal is being provided from the start/stop switch 19.

In addition to advantages (1) to (3) of the first embodiment, the second embodiment has the advantages described below.

(4) Even if one of the first and second FETs 29*a* and 29*b* is OFF, the relays 22 and 23 remain activated as long as the other one of the FETs 29*a* and 29*b* is ON. Therefore, even if an abnormality occurs in one of the FETs 29*a* and 29*b* when the vehicle 2 is traveling, the relays 22, 23 are prevented from being switched OFF.

(5) When the IG1 relay 22 or the IG2 relay 23 is activated, the latch circuit 41 holds the relays 22 and 23 in the activated state until the pushing of the start/stop switch 19 is completed. A holding signal showing that the relays 22 and 23 are in an activated state, or a high signal output from the output terminal OUT of the latch circuit 41, is sent to the power supply control unit 15. Therefore, the power supply control unit 15 acknowledges whether the latch circuit 41 is functioning normally after the pushing of the start/stop switch 19 is completed. This facilitates the monitoring of the power supply control unit 15 to detect an abnormality of the latch circuit 41. Since abnormality of the latch circuit 41 is easily detected, maintenance of the latch circuit 41 is facilitated.

Next, a third embodiment of the present invention will be discussed with reference to FIGS. 4A and 4B. Only the differences from the first embodiment will be described. The third embodiment differs from the first embodiment in the configuration of the AND circuit 42 in that the output signal of the latch circuit 41 is sent to the power supply control unit 15.

Figure 4A:
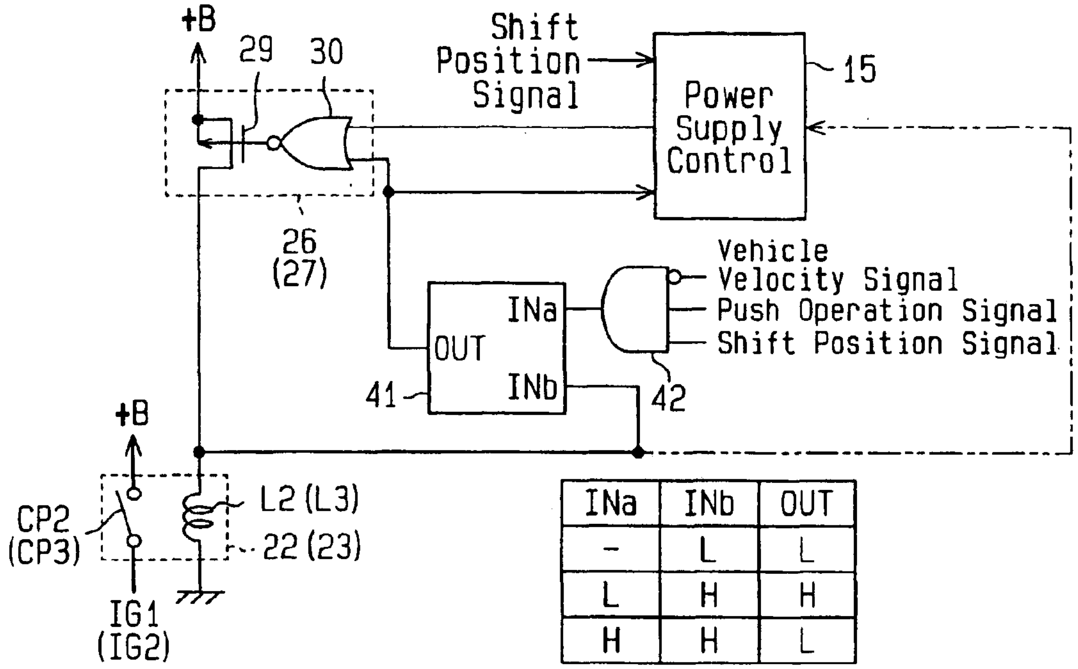
FIG. 4A is a schematic diagram of a relay activation circuit according to a third embodiment of the present invention.
Figure 4B:
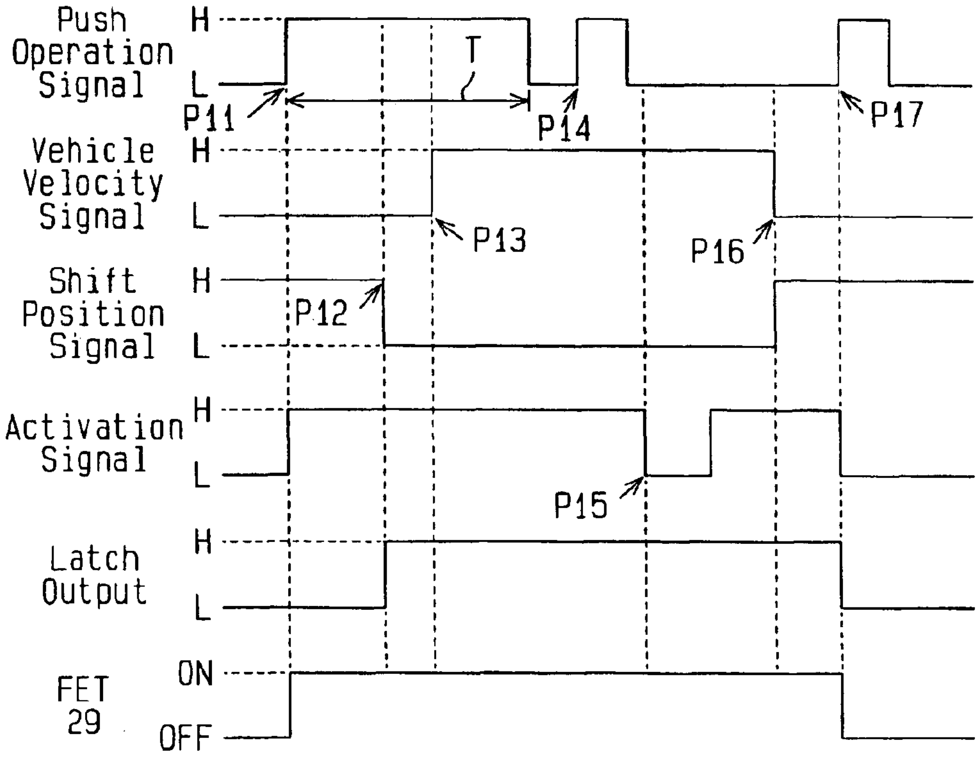
FIG. 4B is a chart illustrating the output timing of various signals in the relay activation circuit of FIG. 4A.

As shown in FIG. 4A, the AND circuit 42 has three input terminals and one output terminal. The AND circuit 42 has a first input terminal provided with the velocity signal, a second input terminal provided with the pushing operation signal, and a third input terminal provided with a shift position signal. The shift position signal is sent from a shift level position sensor (not shown). When the shift level is in a stop position, such as the parking (P) position or a neutral (N) position, the shift position signal is high. When the shift position is in a driving position, such as a drive (D) position or a reverse (R) position, the shift position signal is low.

The signal output from the AND circuit 42 goes high only when the vehicle velocity is null, the start/stop switch 19 is pushed, the shift lever is in the stop position. In other words, when the vehicle 2 is traveling, the start/stop switch 19 is not pushed, or the shift position is switched to a driving position, the signal output from the AND circuit 42 goes low.

The output terminal OUT of the latch circuit 41 is connected to the second terminal of the NOR circuit 30 and the power supply control unit 15. The output signal and the shift position signal are sent from the latch circuit 41 to the power supply control unit 15. Thus, the power supply control unit 15 recognizes whether the shift position is in the driving position or another position. When the signal provided to the first input terminal INa of the latch circuit 41 is high and the signal provided to the second input terminal INb is low, the signal output from the output terminal OUT of the latch circuit 41 is high. If the corresponding relays 22 and 23 are activated and the pushing operation signal is sent to the latch circuit 41 when the vehicle 2 is not traveling or if the shift position is not in the driving position, the signal output from the latch circuit 41 is high. The power supply control unit 15 determines that the latch circuit 41 is functioning normally when receiving a high signal from the latch circuit 41.

If the pushing operation signal is not received when the vehicle 2 is not traveling, or if a low signal is received from the latch circuit 41 even though the shift lever is not in the driving position, the power supply control unit 15 determines that the latch circuit 41 is functioning erroneously. The power supply control unit 15 informs the driver of an abnormality in the latch circuit 41 with an indicator (not shown) arranged in the passenger compartment. In the third embodiment, the power supply control unit 15 starts such abnormality determination from when the power supply control unit 15 starts to send the activation signals to the driver circuits 26 and 27.

Next, the operation of the engine control system 1 of a third embodiment will be discussed with reference to the time chart of FIG. 4B.

At time P11 when the engine is not running, the start/stop switch 10 provides the pushing operation signal to the power supply control unit 15, which is in a state in which the starting of the engine is permitted. In response to the pushing operation signal, the power supply control unit 15 sends an activation signal to each of the driver circuits 26 and 27. In accordance with the activation signal, the NOR circuit 30 sends a low signal to the FET 29 to switch ON the FET 29. This activates the relays 22 and 23 and provides a high signal to the second input terminal INb of the latch circuit 41. However, since the start/stop switch 19 is being pushed continuously, the pushing operation signal is high. Further, the vehicle 2 is in a parked state and the shift lever is located at a non-driving position. Thus, the shift position signal is high. The vehicle velocity is null. Thus, the velocity signal is low. Accordingly, the signal output from the AND circuit 42 is high. The high signal is provided to the first input terminal INa of the latch circuit 41, and the output terminal OUT outputs a low signal. Therefore, the latch circuit 41 does not hold the activation state of the relays 22 and 23.

At time P12 in period T, during which the start/stop switch 19 is being pushed, the shift lever is shifted from the non-driving position to a driving position. This causes the shift position signal, which is provided to the first input terminal INa of the latch circuit 41, to go low and the signal output from the output terminal OUT of the latch circuit 41 to go high. That is, even when the start/stop switch 19 is being pushed, the shifting of the shift lever to a driving position functions as a trigger for holding the activation state of the relays 22 and 23. The power supply control unit 15 recognizes that the high signal is being output from the latch circuit 41 when the shift lever is shifted to a driving position and determines that the latch circuit 41 is functioning normally. When the signal input from the latch circuit 41 is low, the power supply control unit 15 informs the driver of an abnormality in the latch circuit 41 with the indicator.

At time P13, the vehicle 2 starts to travel and the power supply control unit 15 and the first input terminal of the AND circuit 42 are provided with the high velocity signal. If the start/stop switch 19 is erroneously pushed when the vehicle is traveling at time P14, the stopping of the engine is prohibited in this state. Thus, the power supply control unit 15 continues to output the activation signals to the driver circuits 26 and 27. Since the latch circuit 41 continuously outputs the high signal, the FET 29 remains ON. Even if the start/stop switch 19 is erroneously pushed when the vehicle is traveling, the relays 22 and 23 remain activated and the engine does not stop.

If the output of the activation signal is stopped accidentally due to erroneous functioning of the power supply control unit 15 when the vehicle is traveling at time P15, the signal provided to the first input terminal INa is not high. Thus, the latch circuit 41 continues to output the high signal and the FET 29 remains ON. Accordingly, the relays 22 and 23 remain activated and the engine continues running. Even if the power supply control unit 15 functions erroneously when the vehicle is traveling, the IG1 relay 22 and the IG2 relay 23 are prevented from being inactivated.

At time P16, the vehicle is in a condition not traveling. Thus, the low velocity signal is sent to the power supply control unit 15 and the first input terminal of the AND circuit 42. At time P17, when the pushing operation signal is sent to the power supply control unit 15 and the AND circuit 42, the power supply control unit 15 stops sending the activation signals to the driver circuits 26 and 27. That is, the signal provided to the first input terminal of the NOR circuit is low, the signal provided to the first input terminal INa of the latch circuit 41 is high, and the signal output from the output terminal OUT is low. Since the signal provided to the second input terminal of the NOR circuit 30 is low, the signal output from the NOR circuit 30 is high and switches OFF the FET 29. This inactivates the relays 22 and 23 and stops the engine.

In addition to advantages (1) to (3) of the first embodiment, the third embodiment has the advantages described below.

(6) When the switching means of which activation is subject to being held, or the IG1 relay 22 and the IG2 relay 23, is operated, the latch circuit 41 starts to hold the activation state of the relays 22 and 23 from when the pushing operation of the start/stop switch 19 is completed. A holding signal showing that the activation states of the relays 22 and 23 are being held, that is, a high signal output from the output terminal OUT of the latch circuit 41, is provided to the power supply control unit 15. Accordingly, after pushing of the start/stop switch 19 is completed, it is determined whether or not the latch circuit 41 is functioning normally. That is, the power supply control unit 15 easily monitors the activation of the latch circuit 41 and detects abnormality of the latch circuit 41.

When the shift lever is shifted from a non-driving position to a driving position (time P12) when the start/stop switch 19 is being pushed, the latch circuit 41 starts holding the activation states of the relays 22 and 23. That is, when the start/stop switch 19 is continuously pushed after the IG1 relay 22 and the IG2 relay 23 are activated by the power supply control unit 15, the latch circuit 41 starts to hold the activation states of the relays 22 and 23 when the shift lever is shifted from the non-driving position to the driving position. Therefore, even if the vehicle 2 is about to travel when the pushing operation of the start/stop switch 19 is not completed, the power supply control unit 15 detects an abnormality of the latch circuit 41 before the vehicle 2 starts to travel. This guarantees that the driver is informed of an abnormality in the latch circuit 41 before the vehicle 2 starts to travel.

It should be apparent to those skilled in the art that the present invention may be embodied in many other specific forms without departing from the spirit or scope of the invention. Particularly, it should be understood that the present invention may be embodied in the following forms.

Figure 5:
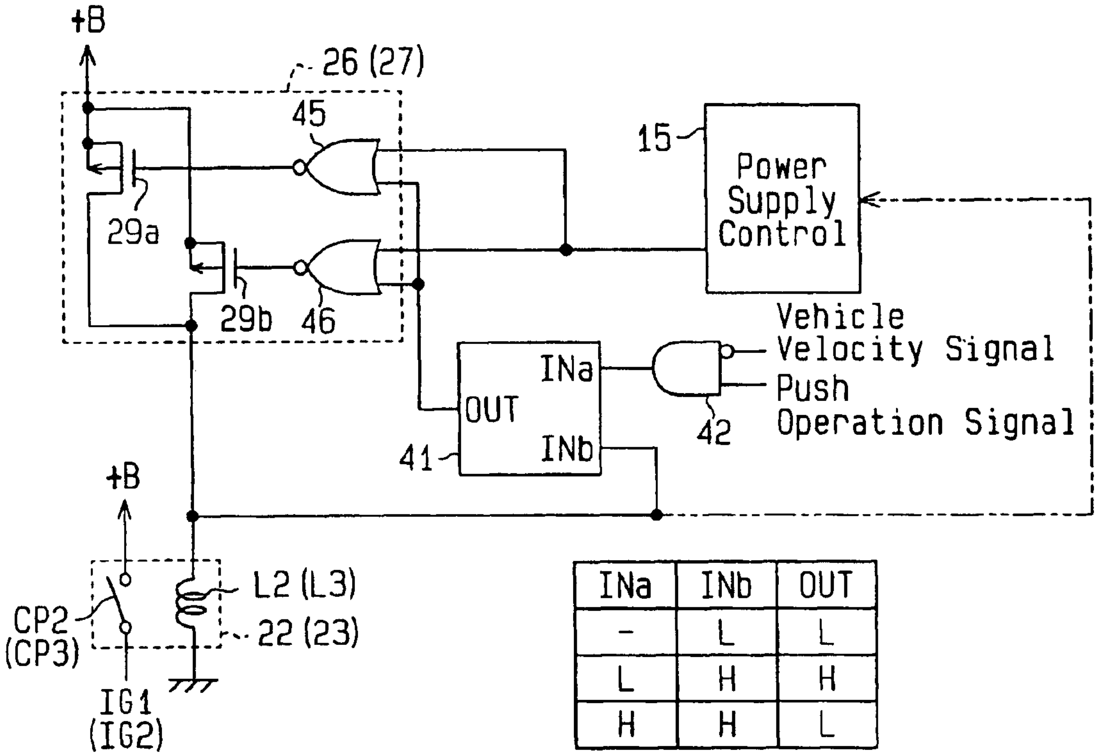
FIG. 5 is a schematic diagram showing a modified example of the relay activation circuit.
Figure 6:
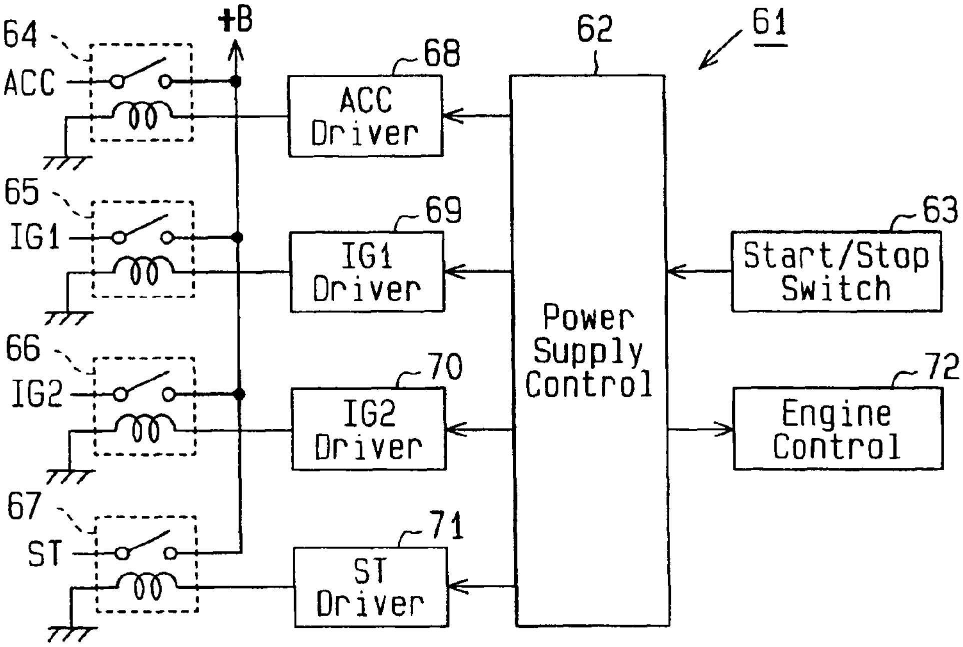
Fig.6 (Prior Art)
FIG. 6 is a partial block diagram of a prior control system for starting and stopping an engine.

As shown in FIG. 5, each of the driver circuits 26 and 27 may be configured by a first FET 29*a*, a second FET 29*b*, a first NOR circuit 45, and a second NOR circuit 46. More specifically, the activation signal from the power supply control unit 15 is provided to the first input terminal of each NOR circuit 45 and 46. The output signal from the latch circuit 41 is provided to the second input terminal of each NOR circuit 45 and 46. The output terminal of the first NOR circuit 45 is connected to the gate terminal of the first FET 29*a*, and the output terminal of the second NOR circuit 46 is connected to the gate terminal of the second FET 29$b$. Accordingly, the driver circuits 26 and 27 are redundant. If an abnormality occurs in one of the FETs 29$a$ and 29$b$, the other one of the FETs 29$a$ and 29$b$ keep the relays 22 and 23 activated. Further, the latch circuit 41 prevents the engine from being stopped when the vehicle is traveling. This further improves reliability. The driver circuits 26 and 27 redundantly configure two routes. However, despite the redundancy, more than three routes may be configured by the driver circuits 26 and 27 may be further redundant to have more than three routes.

As shown by the broken lines in FIGS. 2A, 3A, 4A, and 5, the signal sent to the second input terminal INb of the latch circuit 41 may be sent to the power supply control unit 15. Accordingly, the power supply control unit 15 immediately recognizes whether the relays 22, 23 are ON or OFF when the latch circuit 41 recovers to a normal state from an abnormal state. Therefore, the power supply control unit 15 immediately performs the control that was performed right before the abnormality occurred. For example, when the latch circuit 41 recovers to a normal state from an abnormal state, the power supply control unit 15 immediately sends the activation signal to the driver circuits 26 and 27 as long as each relay 22 and 23 is activated.

The third embodiment is a modified example of the first embodiment. However, the main portions of the third embodiment, that is, the configuration of the AND circuit 42 and the configuration for monitoring the latch circuit 41 with the power supply control unit 15 may be applied to other embodiments.

The driver may be informed of an abnormality in the latch circuit 41 by a voice or a noise.

The latch circuit 41 outputs the low signal if the start/stop switch 19 is pushed and the vehicle 2 is not traveling. However, the latch circuit 41 may output the low signal just when the vehicle 2 is not traveling. That is, the pushing operation of the start/stop switch 19 is not required for the output signal of the latch circuit 41 to go low. This also prevents the engine from stopping when the vehicle 2 is traveling.

The velocity signal, which is generated by hardware, is sent to the first input terminal of the AND circuit 42. However, the velocity signal may be a signal that is generated by processing a program with a microcomputer. However, in this case, the velocity signal is required to be generated by a microcomputer other than that included in the power supply control unit 15 (e.g., a microcomputer included in the control unit 14, 16–18).

The latch circuit 41 may be connected to the driver circuit 25, which activates the ACC relay 21, in addition to the driver circuit 26, 27, which operates the IG1 relay 22 and the IG2 relay 23. In such a case, the activation state of the ACC relay 21 is held by an additional latch circuit 41, and ACC electric devices are prevented from being switched OFF when the vehicle 2 is running.

The latch circuit 41 may be connected only to the IG2 driver circuit 27. In this case, since the activation state of the IG2 relay 23 is held, the supply of power to the engine control unit 17 continues and stopping of the engine when the vehicle 2 is traveling is prevented.

The steering lock mechanism 31 of the engine start/stop system 1 may be eliminated.

In the above embodiments, the engine start/stop control system 1 permits the starting of the engine based on the intercommunication between the portable device 11 and the vehicle controller 12. Instead, for example, the engine start/stop control system 1 may permit the starting of the engine by inserting a mechanical key into a key cylinder and starting or stopping the engine by pushing the start/stop switch 19.

The engine start/stop control system does not have to be a single push system as long as the power supply control unit 15 controls activation of the relays 21–25.

What is claimed is:

1. A system for controlling starting and stopping of an engine in a vehicle, wherein the vehicle has a plurality of electric devices including a driving electric device required to keep the vehicle in a traveling state, the system comprising:

- a plurality of switching circuits for supplying power and stopping the supply of power to the electric devices, the plurality of switching circuits including a driving switching circuit for supplying power or stopping the supply of power to the driving electric device;
- a power supply control unit for generating a plurality of activation signals, each switching an associated one of the switching circuits between an inactivated state and an activated state; and
- an activation holding circuit for holding the state of the driving switching circuit and enabling the driving switching circuit to be switched from an activated state to an inactivated state when the vehicle is in a non-traveling state.

2. The system according to claim 1, wherein the vehicle has a push button switch pushed by a driver to start and stop the engine, and the activation holding circuit enables the driving switching circuit to be switched to the inactivated state if the push button switch is pushed when the vehicle is in the non-traveling state.

3. The system according to claim 1, further comprising:

- a first activation device arranged between the driving switching circuit and the power supply control unit to activate the driving switching circuit in accordance with the associated activation signal; and
- a second activation device arranged in parallel to the first activation device, wherein when the first activation device is switched ON, the activation holding circuit keeps the second activation device ON to hold the driving switching circuit in the activated state and switches the second activation device OFF to enable the driving switching circuit to be switched to the inactivated state.

4. The system according to claim 1, wherein the vehicle has a push button switch pushed by a driver to start and stop the engine and a shift lever switchable between driving and non-driving positions, and the power supply control unit outputs the activation signal for switching the driving switching circuit to the activated state when the push button switch is pushed and the engine is in a state in which starting of the engine is permitted; and

- the activation holding circuit starts holding the driving switching circuit in the activated state and provides the power supply control unit with a holding signal to indicate that the activated state is being held when either the pushing of the push button switch is completed after the driving switching circuit is activated or position of the shift lever is switched from the non-driving position to the driving position.

5. The system according to claim 1, further comprising a plurality of activation devices arranged in parallel between the driving switching circuit and the power supply control unit to activate the driving switching circuit in response to the associated activation signal, wherein the activation holding circuit holds the driving switching circuit in the activated state by holding each of the activation devices in a state switched ON and releases the activation devices from the ON state to enable the driving switching device to be switched to the inactivated state.

6. The system according to claim 1, wherein the power supply control unit monitors the state of the driving switching circuit and generates the activation signal associated with the driving switching circuit in accordance with the held state of the driving switching circuit when the power supply control unit returns from an abnormal state to a normal state.

7. A system for controlling starting and stopping of an engine mounted on a vehicle, wherein the engine includes an electric engine device for operating the engine when activated, the system comprising:

a relay connected to the electric engine device to supply the electric engine device with power when activated;

a driver circuit for activating and inactivating the relay in response to an activation signal;

a power supply control unit for providing the driver circuit with the activation signal;

a latch circuit connected to the driver circuit for holding the relay in the activated state when the vehicle is traveling and for enabling the relay to be switched from the activated state to an inactivated state for at least when the vehicle is not traveling.

8. The system according to claim 7, wherein the latch circuit keeps the relay activated even if the power supply control unit stops outputting the activation signal when the vehicle is traveling.

9. The system according to claim 8, wherein the vehicle includes a push button switch pushed by a driver to start and stop the engine, the latch circuit keeping the relay activated even if the push button switch is pushed when the vehicle is traveling.

10. The system according to claim 9, wherein the latch circuit enables the relay to be inactivated if the push button switch is pushed when the vehicle is not traveling.

11. The system according to claim 9, wherein the electric engine device is activated when the vehicle is not traveling, the push button switch is pushed, and the power supply control unit outputs the activation signal.

12. The system according to claim 7, wherein the electric engine device is an engine control unit for controlling the engine.

13. A system for controlling starting and stopping of an engine in a vehicle, wherein the vehicle has a plurality of electric devices including a driving electric device required to keep the vehicle in a traveling state, the system comprising:

a plurality of switching circuits for supplying power and stopping the supply of power to the electric devices, the plurality of switching circuits including a driving switching circuit for supplying power or stopping the supply of power to the driving electric device;

a power supply control unit for generating a plurality of activation signals, each switching an associated one of the switching circuits between an inactivated state and an activated state; and holding means for holding the state of the driving switching circuit and enabling the driving switching circuit to be switched from an activated state to an inactivated state when the vehicle is in a non-traveling state.

14. The system according to claim 13, wherein the vehicle has a push button switch pushed by a driver to start and stop the engine, and the holding means enables the driving switching circuit to be switched to the inactivated state if the push button switch is pushed when the vehicle is in the non-traveling state.

15. The system according to claim 13, further comprising:

a first activation device arranged between the driving switching circuit and the power supply control unit to activate the driving switching circuit in accordance with the associated activation signal; and a second activation device arranged in parallel to the first activation device, wherein when the first activation device is switched ON, the holding means keeps the second activation device ON to hold the driving switching circuit in the activated state and switches the second activation device OFF to enable the driving switching circuit to be switched to the inactivated state.

16. The system according to claim 13, wherein the vehicle has a push button switch pushed by a driver to start and stop the engine, and the power supply control unit outputs the activation signal for switching the driving switching circuit to the activated state when the push button switch is pushed and the engine is in a state in which starting of the engine is permitted; and the holding means starts holding the driving switching circuit in the activated state and provides the power supply control unit with a holding signal to indicate that the activated state is being held when the pushing of the push button switch is completed after the driving switching circuit is activated.

17. The system according to claim 13, further comprising a plurality of activation devices arranged in parallel between the driving switching circuit and the power supply control unit to activate the driving switching circuit in response to the associated activation signal, wherein the holding means holds the driving switching circuit in the activated state by holding each of the activation devices in a state switched ON and releases the activation devices from the ON state to enable the driving switching device to be switched to the inactivated state.

18. The system according to claim 13, wherein the power supply control unit monitors the state of the driving switching circuit and generates the activation signal associated with the driving switching circuit in accordance with the held state of the driving switching circuit when the power supply control unit returns from an abnormal state to a normal state.

19. The system according to claim 16, wherein the vehicle includes a shift lever switchable between driving and non-driving positions, and the holding means starts holding the driving switching circuit in the activated state and provides the power supply control unit with a holding signal to indicate that the activated state is being held when either the pushing of the push button switch is completed after the driving switching circuit is activated or the position of the shift lever is switched from the non-driving position to the driving position.

20. The system according to claim 13, wherein the holding means comprises a latch circuit.

* * * * *